United States Patent [19]

Pace

[11] Patent Number: 5,109,172
[45] Date of Patent: Apr. 28, 1992

[54] PERMANENT MAGNET MOTOR HAVING DIVERTING MAGNETS

[76] Inventor: Sang H. L. Pace, 3802 Greenshadow, Pasadena, Tex. 77503

[21] Appl. No.: 514,499

[22] Filed: Apr. 26, 1990

Related U.S. Application Data

[63] Continuation-in-part of Ser. No. 343,923, Apr. 26, 1989, Pat. No. 5,008,578.

[51] Int. Cl.$^5$ .................. H02K 21/26; H02K 23/04; H02K 1/12; H01F 7/02
[52] U.S. Cl. ................................. 310/154; 310/256; 335/304
[58] Field of Search ............... 310/42, 154, 155, 181, 310/186, 254, 256; 335/302, 304, 306

[56] References Cited

U.S. PATENT DOCUMENTS

| | | | |
|---|---|---|---|
| 2,894,156 | 7/1959 | Kent | 310/154 |
| 3,083,310 | 3/1963 | Tweedy et al. | 310/154 |
| 3,168,686 | 2/1965 | King et al. | 335/306 |
| 3,906,268 | 9/1975 | de Graffenried | 310/154 |
| 4,243,903 | 1/1981 | Mishima | 310/154 |
| 4,376,903 | 3/1983 | Mishima | 310/154 |
| 4,445,060 | 4/1984 | Rühle et al. | 310/154 |
| 4,459,500 | 7/1984 | Miyamoto | 310/154 |
| 4,481,437 | 11/1984 | Parker | 310/154 |
| 4,542,314 | 9/1985 | Corbach et al. | 310/154 |
| 4,645,961 | 2/1987 | Malsky | 310/254 |
| 5,013,951 | 5/1991 | Stadnik et al. | 310/156 |

FOREIGN PATENT DOCUMENTS

117418  7/1964  Fed. Rep. of Germany ...... 310/154

Primary Examiner—Steven L. Stephan
Assistant Examiner—C. La Balle
Attorney, Agent, or Firm—Foley & Lardner

[57] ABSTRACT

A dc electric motor having a rotor, a stator, and at least a pair of oppositely disposed main magnets associated with one of the rotor and stator is provided. Preferably, the main magnets are associated with the stator in a stator assembly. The stator assembly also includes interpolar diverting magnets positioned on each side of each main magnet. Additionally, an end diverting magnet assembly including at least a pair of oppositely disposed end diverting magnets may be positioned at at least one end of the stator assembly. Each of the interpolar diverting magnets and end diverting magnets have a magnetic field perpendicular to the magnetic field of the main magnets and are oriented to increase the flux density of the main magnets with low magnetic leakage.

3 Claims, 9 Drawing Sheets

PERMANENT MAGNET MOTOR HAVING DIVERTING MAGNETS

RELATED APPLICATIONS

This is a continuation-in-part application of U.S. Ser. No. 07/343,923 filed Apr. 26, 1989, now U.S. Pat. No. 5,008,578, the subject matter whereof which is hereby incorporated herein by reference.

TECHNICAL FIELD OF THE INVENTION

This invention relates, in general, to permanent magnet dc electric motors having a rotor and a stator, and at least a pair of oppositely disposed main magnets. In particular, this invention relates to diverting magnets for use with the main magnets which provide a magnetic field having a very high flux density with low magnetic leakage. More particularly, the present invention relates to a permanent magnet stator for a dc electric motor having diverting magnets which provide high reluctance at the inner periphery of the stator magnets and low magnetic leakage between the interpolar space and the outer periphery of the stator magnets.

BACKGROUND OF THE INVENTION

The present invention is based upon the free pole theory. In a permanent magnet, the atoms consist of very small atomic nuclei surrounded by clouds of electrons. In some kinds of atoms, there are more electrons circling in a clockwise direction around the atom axis than are circling in a counter-clockwise direction. A rotational motion of electrons around the nucleus thus results which creates a current and develops a magnetic field. These atoms are, in effect, little permanent magnets with external fields, just like the field of a dipole.

It is a well known phenomenon that when two like poles of permanent magnets are facing each other, strong repulsion occurs therebetween. The magnetomotive force (mmf) in the middle of the two like poles becomes greater than the original mmf. Moreover, because of opposing magnetic fields, negative divergence occurs near the center of the two like pole magnets. The negative divergence of a magnetic pole at a point inside of the body equals the pole strength per unit volume at that point. These diverged poles are called free poles. In the case of unlike poles which attract each other, all of the free poles are diverged to the opposite side of the magnet which intensifies the flux density at both ends of the magnet.

The present invention, while having application to all dc electric motors, is primarily directed toward conventional, inexpensive, cylindrical, permanent magnet brush-type dc electric motors. Such brush-type dc motors typically utilize fairly inexpensive ceramic magnets (ferrite magnets). These type motors find application in a variety of different fields including electric boat trolling motors, automobile motors, sub-fractional motors for battery powered tools and the like.

These conventional motors typically are inefficient and noisy. Moreover, these conventional motors tend not to be very powerful. While existing technologies and materials are available to increase the efficiency and performance of these motors, those technologies and materials are costly. Therefore, because these motors are generally mass produced for commercial applications, it is not cost effective or practical to employ such known technologies in these type motors. For example, to improve the performance and efficiency of a motor of the foregoing type, one could utilize the brushless type motor and rare earth cobalt magnet. However, the electronic control device for brushless type motors typically costs more than the motor itself. Therefore, the modification would be impractical.

In order to design a quiet and efficient permanent magnet dc motor, many important design parameters must be considered. Some of these design parameters include: maximizing the flux density at the pole-arc faces, i.e. the inner periphery of the stator magnets, while at the same time maximizing reluctance; decreasing the inner pole magnetic flux leakage; and, decreasing the magnetic flux leakage at the outer periphery of the stator magnets.

Conventional two pole dc motors have large interpole working air gaps. The greater reluctance of the large air gap reduces the total flux; however, a shorter interpole working air gap is also undesirable as it tends to increase the magnetic flux leakage between the poles because there is little difference in the reluctance of the useful flux and the leakage path in the interpole region. Additionally, the flux density waveform distortion in the interpole region, in turn, results in armature fluctuations and slot harmonics. These results tend to make conventional motors quite noisy.

Although the magnetic flux can be encouraged to follow a ferromagnetic path and to cross a working air gap, it cannot be confined completely to that path because the ferromagnetic material exhibits a non-linear relationship between flux density B and the magnetizing force H. This situation is known as a saturation phenomenon. Moreover, when the magnetic flux path is encouraged to pass through a ferromagnetic material, such as a pole piece, a substantial amount of reluctance is lost, in turn resulting in a less efficient motor.

Prior art designs have attempted to increase the useful flux density between main stator magnets and reduce magnetic leakage. For example, Mishima, U.S. Pat. No. 4,376,903 issued Mar. 15, 1983 discloses a direct current dynamo electric machine including a non-magnetic cylindrical rotor and a non-cylindrical stator. The stator comprises oppositely disposed permanent magnets externally of the cylindrical coreless rotor and a series of blocking magnets for blocking the leakage magnetic flux of the magnetic field of the permanent magnets by a reverse magnetic field. The blocking magnets include primary blocking magnets and auxiliary blocking magnets. The auxiliary blocking magnets divert the leakage from the primary blocking magnets and the main magnets along a path through the air gap between the auxiliary blocking magnets. This path causes a loss in reluctance, and thus, a corresponding loss of mmf. The orientation of the auxiliary blocking magnets also is disadvantageous because it generates an additional leakage flux. The auxiliary blocking magnets do not function as interpolar magnets because they do not provide proper magnetic orientation or a proper flux density waveform between the two main stator magnets. Also, that field system is designed for a non-magnetic cylindrical rotor type motor having a large interpole gap and a rectangular configuration, and thus cannot practically and effectively be applied to an inexpensive permanent magnet dc electric motor having copper windings on a permeable iron rotor contained within a cylindrical housing.

Mishima, U.S. Pat. No. 4,243,903 issued Jan. 6, 1981, discloses another direct current dynamo electric machine described as an improvement over the device of U.S. Pat. No. 4,376,903. This field system has two main stator magnets having an extra large interpole gap and two main blocking magnets located between the interpole region. The blocking magnets apply a reverse magnetic field against the main magnets. The two blocking magnets each produce a magnetic field opposite in direction but equal in intensity to the magnetic field between the main magnets. At the vicinity of the boundary area where the two opposing poles meet together a very high intensity magnetic flux is created. While this may be good as useful reluctance for the armature, these boundary areas emit a strong magnetic field through the yoke as wasted magnetic leakage.

Another previous field system for reducing leakage magnetic field and increasing flux density is disclosed in de Graffenried U.S. Pat. No. 3,906,268, issued Sep. 16, 1975. This field system is designed for a non-magnetic cylindrical rotor and a non-cylindrical type housing having a large air space between the rotor surface and iron housing wall. The large space serves to accommodate a plurality of magnets disposed in contact with magnetically permeable pole pieces on many sides to increase the air gap flux density. The magnetic flux path passes through the magnetically permeable pole piece, to the air gap, and then to the armature. This path through the magnetically permeable material causes a loss in overall reluctance. Because mmf is the product of the magnetic flux and the reluctance, substantial mmf is lost resulting in the motor having an overall lower efficiency. Moreover, it is impractical to apply this field system to existing cylindrical type permanent magnet dc electric motors because of the limited spaces between the motor housing wall and the armature surface in such conventional motors.

Another previous invention relating to increasing flux density and reducing magnetic leakage is disclosed in Miyamoto U.S. Pat. No. 4,459,500, issued Jul. 10, 1984. This field system includes a pair of auxiliary magnets mounted on the axial end surface of a pole piece to reduce the magnetic flux leakage from the pole piece for increased magnetic force. The positional relationship between the pole piece, the permanent magnets, and the repulsive auxiliary magnets disposed around the pole piece, is such that the diverged magnetic poles are diverged toward the pole piece, thereby intensifying the magnetic flux at the pole piece and providing a high flux density at the pole piece face. However, the field system has low reluctance and a high magnetic leakage at the outer surface.

Therefore, it is obvious that the prior art motors have increased the flux density at the cost of mmf efficiency per fixed magnet volume. Moreover, the prior art field systems cannot practically be applied to conventional inexpensive permanent magnet dc electric motors having copper windings on permeable iron rotors and disposed in a cylindrical housing. The present invention therefore satisfies a long-felt need to provide a permanent magnet construction wherein flux density of the main magnets is increased with low magnetic leakage.

SUMMARY OF THE INVENTION

The present invention provides a dc electric motor contained within a cylindrical housing having a rotor and a stator and at least a pair of oppositely disposed main magnets associated with one of the rotor and stator. In a preferred embodiment, the main magnets are associated with the stator and define a ring having an inner periphery and an outer periphery. At least two interpolar diverting magnets are disposed intermediate the main magnets generally within the ring. The interpolar diverting magnets are magnetized in a direction perpendicular to the magnetic orientation of the main magnets.

In another preferred embodiment end diverting magnets are disposed at each end of each main magnet, each end diverting magnet having a magnetic field directed perpendicular to the magnetic orientation of the main magnets. The end diverting magnets are positioned relative to the main magnets to increase the total mmf with a low magnetic leakage.

In yet another embodiment of the present invention, the stator is provided with permanent magnetic stator excitation to provide a field for a permanent magnet dc motor. The stator assembly is contained within a cylindrical housing and includes at least a pair of oppositely disposed main magnets, and at least a pair of interpolar diverting magnets disposed intermediate of the main magnets. The magnetic orientation of the interpolar diverting magnets is such that the inner periphery of each stator magnet has homopolarity with each interpolar diverting magnet and the outer periphery of each stator magnet has heteropolarity with each interpolar diverting magnet. End diverting magnets may also be employed such that each end diverting magnet has homopolarity with each stator magnet at the inner periphery and heteropolarity with each stator magnet at the outer periphery.

In still another embodiment of the present invention a stator assembly is provided for the reduction of motor noise for typical slotted armature-type dc electric motors. The stator assembly includes at least a pair of oppositely disposed main magnets and at least a pair of interpolar diverting magnets disposed intermediate the main magnets. The interpolar diverting magnets provide a leaner transition from one pole-edge of the interpolar region to the other such that armature fluctuations are minimized.

In yet another embodiment of the present invention a dc electric motor especially suited for use in an electric trolling motor is provided. The motor includes a rotor, a stator, and at least a pair of main magnets associated with the stator. Interpolar diverting magnets are disposed on each side of each main magnet and suitably configured to permit the passage of through bolts which hold the motor assembly together. Additionally, the sum of armature tooth width and slot opening distance is equal to the interpolar gap.

BRIEF DESCRIPTION OF THE DRAWINGS

Preferred and alternative exemplary embodiments of the present invention will hereinafter be described in conjunction with the appended drawings wherein like designations denote like elements, and.

DETAILED DESCRIPTION OF THE PREFERRED EXEMPLARY EMBODIMENTS

Figure 1:
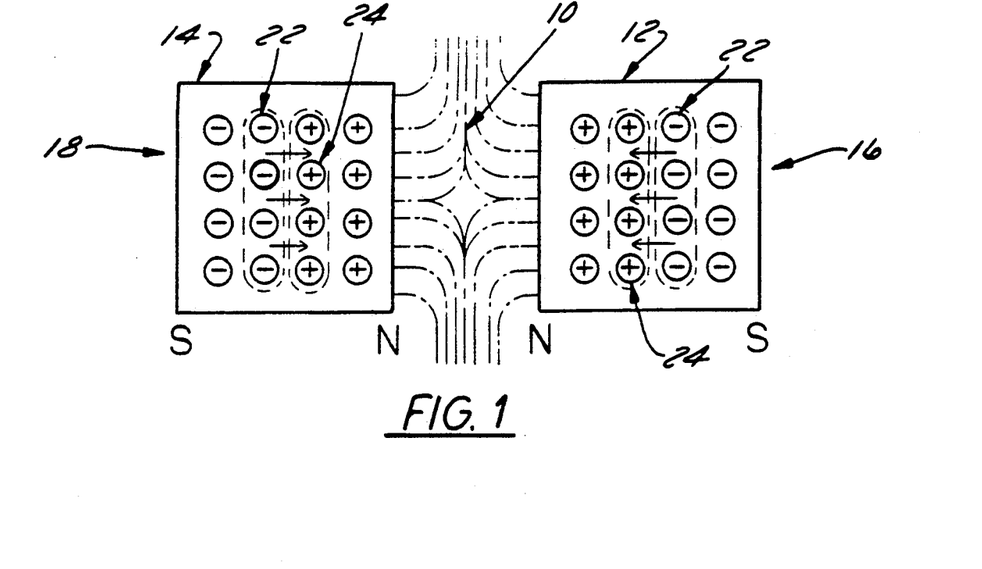
FIG. 1 is a schematic elevational view illustrating the dynamics of free poles between two like magnetic poles.

Referring now to FIGS. 1, 2, 3 and 4, the basic concepts and theory of the present invention are best illustrated. FIG. 1 illustrates the dynamics of free poles inside of permanent magnets when two like poles are facing each other. The flux density is increased at the middle 10 between the two magnets 12 and 14. The flux density at the outer sides 16 and 18 of magnets 12 and 14 is decreased. The negative divergence of magnetic poles inside of the body equals the volume pole density at that point because the negative poles 22 (generally designated) are as the direction of the arrows indicates towards positive poles 24. These negative poles are called free poles. Since free electrons constitute the free poles, a direction of an electron spinning on its own axis is changed under the influence of an induced magnetic field.

Figure 2:
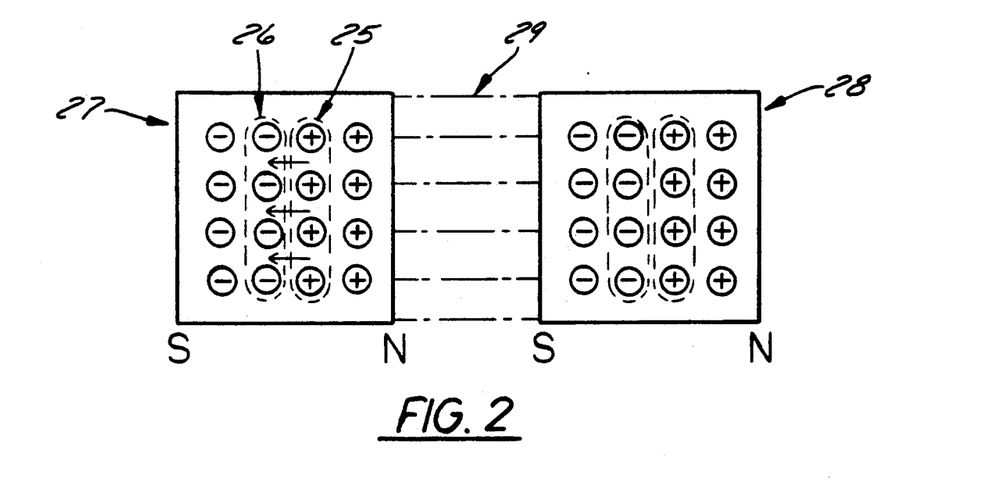
FIG. 2 is a schematic elevational view illustrating the dynamics of the magnetic field between two unlike facing magnetic poles.

FIG. 2 illustrates the dynamics of a magnetic field under the influence of an unlike polarity magnetic field. Positive free poles 25 tend to move to negative area 26 and become negative. Concurrently, the flux density at areas 27 and 28 increases and the flux density at area 29 decreases yielding low reluctance.

Figure 3:
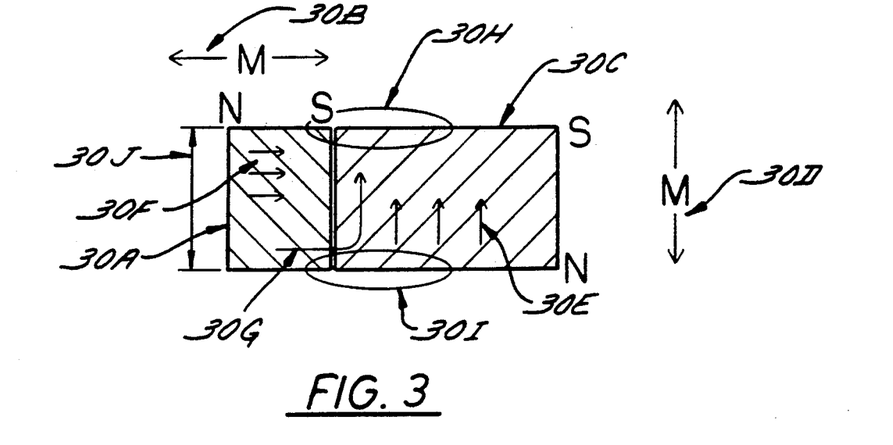
FIG. 3 is a schematic elevational view of a flux pattern illustrating the effect of end diverting magnets in accordance with the present invention.

FIG. 3 is an explanatory diagram for the basic layout between an end diverting magnet 30A and a main stator magnet 30C. End diverting magnet 30A is magnetized in one direction, such as shown by the arrow 30B. Main stator magnet 30C is magnetized in a second direction, such as indicated by the arrow 30D. End diverting magnet 30A is positioned in contact with the main stator magnet 30C. Thus, there is a 90° angle between the field of end diverting magnet 30A magnetization axis (vector) 30B and the field of main stator magnet 30C magnetization axis (vector) 30D.

The magnetic field at the S pole side of main stator magnet 30C is the vectorial sum of a composite magnet field including the original field at the S pole of main stator magnet 30C, the original field at the S pole of end diverting magnet 30A, the sum of the negative field indicated by arrows 30F at the S pole side of end diverting magnet 30A, the negative field indicated by the arrows 30E at the S pole side of main stator magnet 30C, and the positive field moved toward the S pole side of main stator magnet 30C indicated by arrow 30G which owes to the heteropolarity of main stator magnet 30C itself. Thus, the composite field intensifies the flux density at homopolarity side 30H and reduces the flux density at heteropolarity side 30I. Further, as the end diverting height 30J increases, the reluctance at main stator magnet 30C increases.

Figure 4:
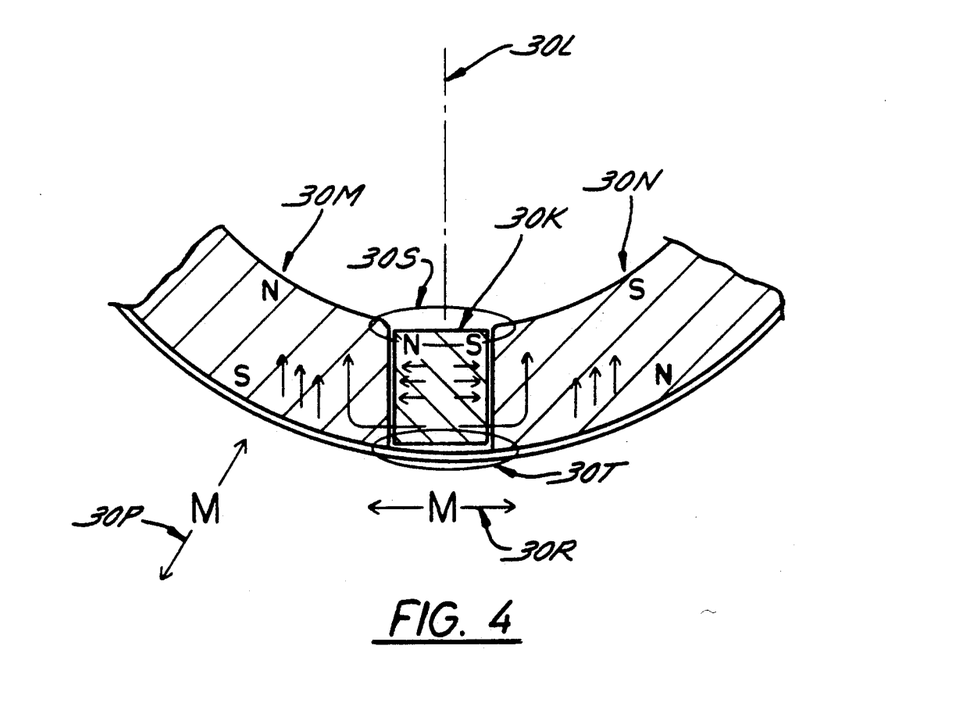
FIG. 4 is a schematic elevational view of a flux pattern illustrating the effect of interpolar diverting magnets in accordance with the present invention.

Now referring to FIG. 4, the basic layout between two main stator magnets 30M and 30N and an interpolar diverting magnet 30K disposed intermediate thereof is illustrated. Interpolar magnet 30K is magnetized perpendicular to the reference radius 30L in the direction noted by the arrow 30R. Main magnets 30M and 30N are magnetized in the direction indicated by the arrow 30P. The axis of magnetization 30R of interpolar magnet 30K is thus about 90° from that of the axis of magnetization 30P of main magnets 30M and 30N.

Interpolar magnet 30K is located in the interpolar region, that is the region between main stator magnets 30M and 30N, and is disposed in contact with each main stator magnet 30M and 30N. Moreover, interpolar magnet 30K is positioned such that it has homopolarity at the inner periphery 30S of main stator magnets 30M and 30N and heteropolarity at the outer periphery 30T of the main stator magnets 30M and 30N. This positioning results in high mmf, i.e. high flux density and high reluctance, at the inner periphery of main stator magnets 30M and 30N and very low magnetic leakage. Additionally, this positioning results in low reluctance at the outer periphery 30T.

The dynamics of free pole action at interpolar magnet 30K and main magnets 30M and 30N is similar to that illustrated in FIG. 3, with the exception that the free pole action occurs concurrently at both sides of interpolar magnet 30K. Utilization of interpolar magnet 30 only provides high mmf, but additionally provides a linear flux density waveform at the interpolar region resulting in reduction of motor noise.

While the present permanent magnet and diverting magnet structure can be associated with either a stator or a rotor, for purposes of illustration only, the present invention will be described in connection with its use in a stator assembly for a dc electric motor.

Figure 5:
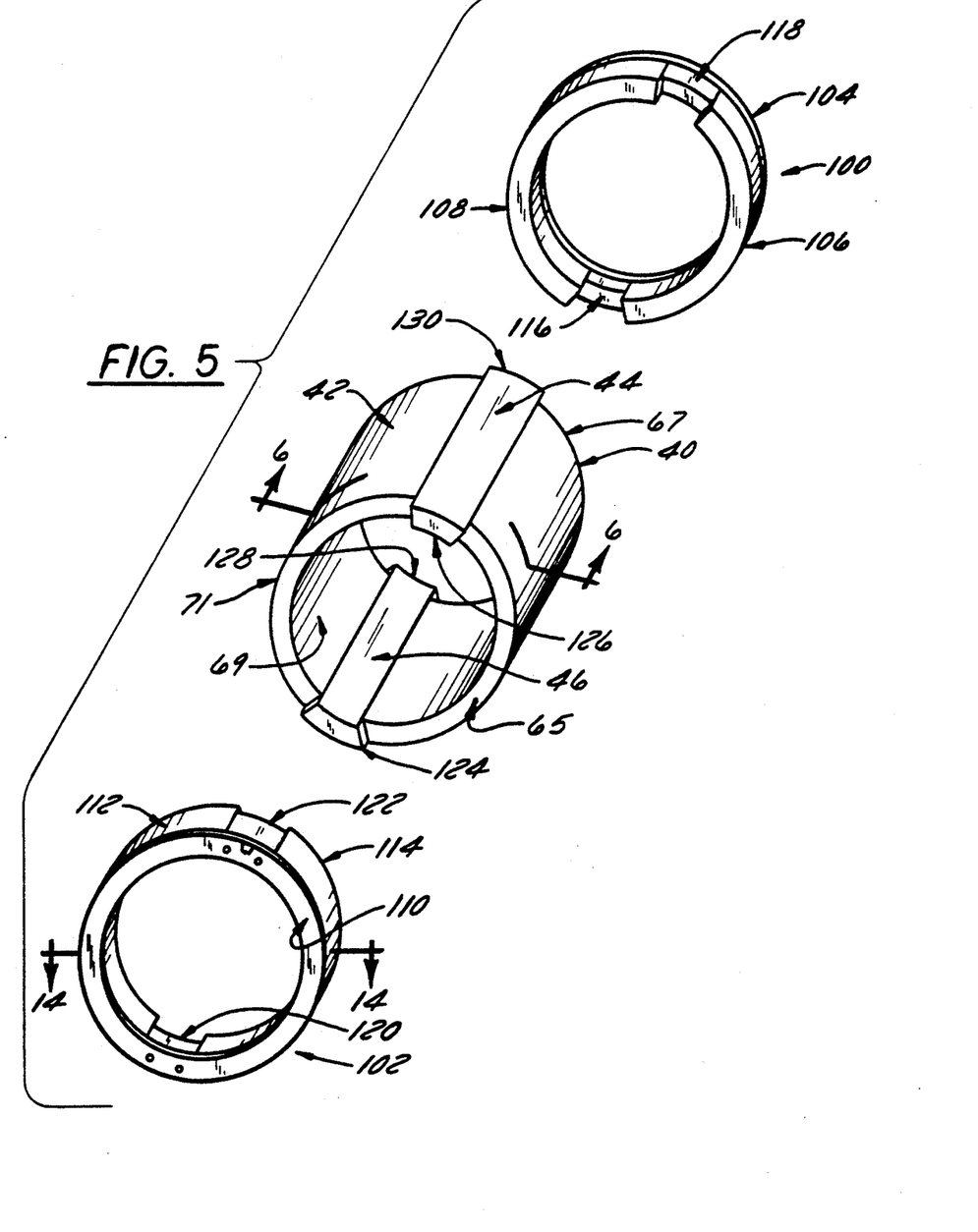
FIG. 5 is an exploded perspective view of stator construction for use in a dc electric motor according to a preferred embodiment of the present invention.
Figure 6:
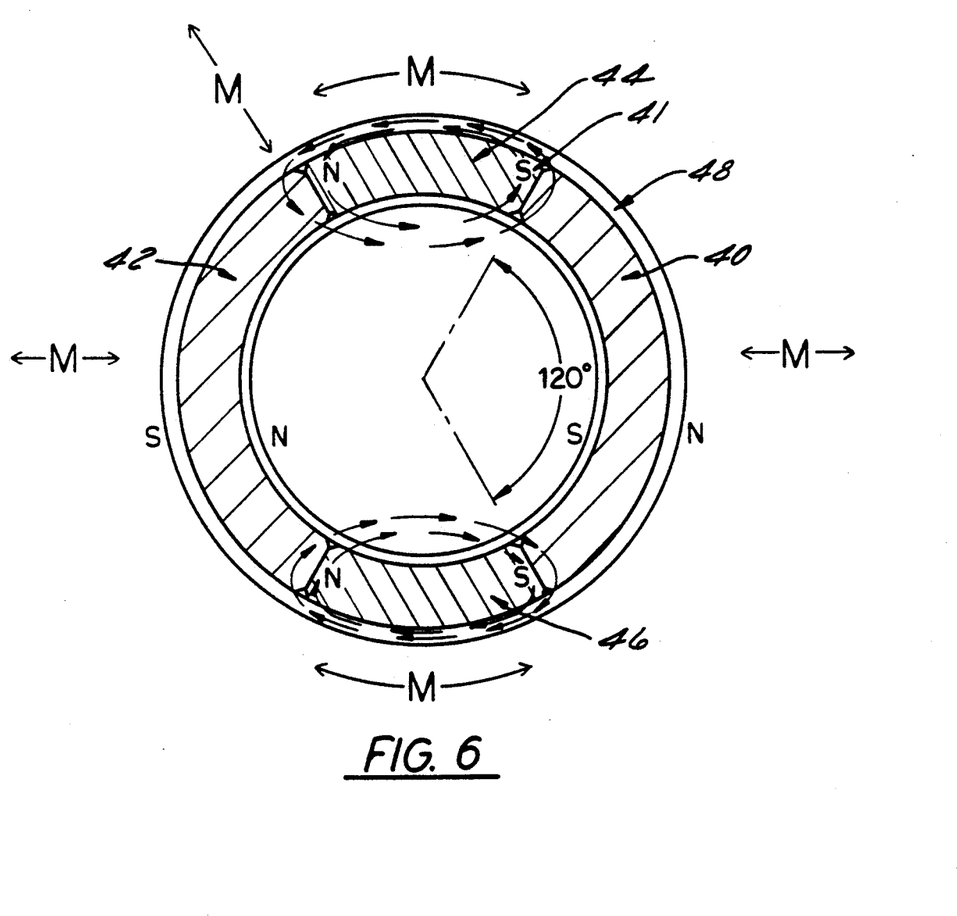
FIG. 6 is a cross-sectional view taken along the line 6—6 of FIG. 5.

Referring now to FIGS. 5 and 6, main stator magnets 40 and 42 are provided oppositely disposed to each other. Preferably, main magnets 40 and 42 are arcuately shaped. While shown in a 2-pole construction, it should be appreciated that 4-pole, 6-pole, etc. constructions are all within the scope of the present invention. In a two-pole construction, however, main magnets 40 and 42 are preferably of a subtended angle of approximately 100° to 175°, more preferably a subtended angle of approximately 120° to 160°, and even more preferably a subtended angle of approximately 120°. Interpolar diverting magnets 44 and 46 are positioned intermediate each main magnet 40 and 42 such that an interpolar diverting magnet is positioned on each side of each main magnet. Interpolar diverting magnets and 44 and 46 are preferably provided between and in contact with main magnets 40 and 42, and are preferably held in contact therewith through the use of any suitable adhesive, such as epoxy. Interpolar diverting magnets are further held in place by a conventional steel housing 48, as shown in FIG. 6.

Figure 7:
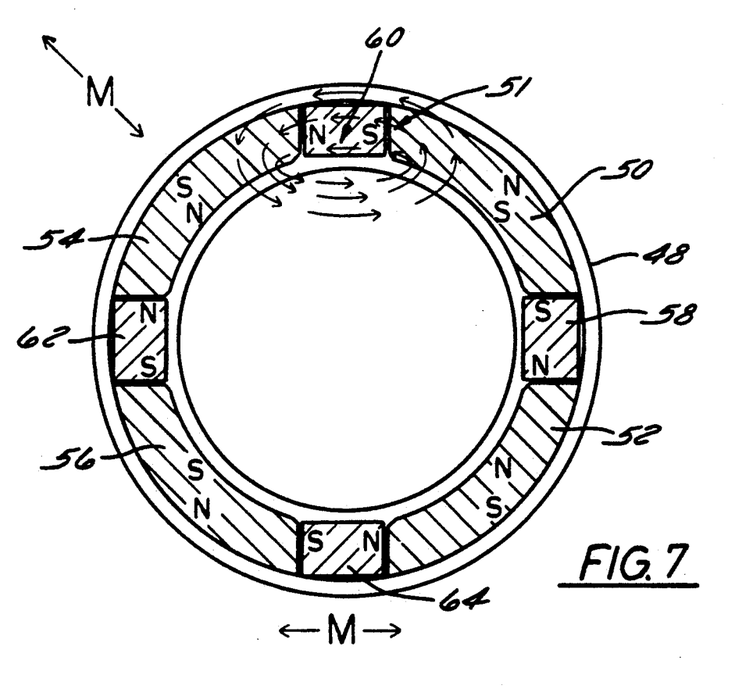
FIG. 7 is a cross-sectional view, similar to FIG. 6, but showing a four-pole permanent magnet construction according to the present invention.

A typical 4-pole construction according to the present invention is depicted in FIG. 7. This construction includes main stator magnets 50, 52, 54 and 56. Intermediate of each main magnet is an interpolar diverting magnet. For example, interpolar diverting magnet 58 is intermediate main magnets 50 and 52; interpolar diverting magnet 60 is intermediate main magnets 50 and 54; interpolar diverting magnet 62 is intermediate main magnets 54 and 56; and, interpolar diverting magnet 64 is intermediate main magnets 52 and 56. When more than two poles are utilized, interpolar diverting magnets are positioned intermediate each adjacent main magnet such that there is an alternating sequence of main magnet-interpolar diverting magnet-main magnet.

As shown, main magnets 40 and 42 of FIG. 5 and main magnets 50, 52, 54 and 56 of FIG. 7 are arcuately shaped and generally define a ring having an inner periphery and an outer periphery; however, other arcuate configurations may be generally defined and are within the scope of the present invention. More particularly, with reference to FIG. 5, the main magnets 40 and 42, in conjunction with interpolar diverting magnets 44 and 46, form a stator assembly which has an upper end 65, a lower end 67, an inner periphery 69 and an outer periphery 71.

Referring again to FIG. 6, in one embodiment of present invention, main magnets 40 and 42 are arcuately shaped and of a subtended angle of approximately 120°. In this embodiment, interpolar diverting magnets 44 and 46 are also arcuately shaped and of a subtended angle of approximately 60°.

Figure 8:
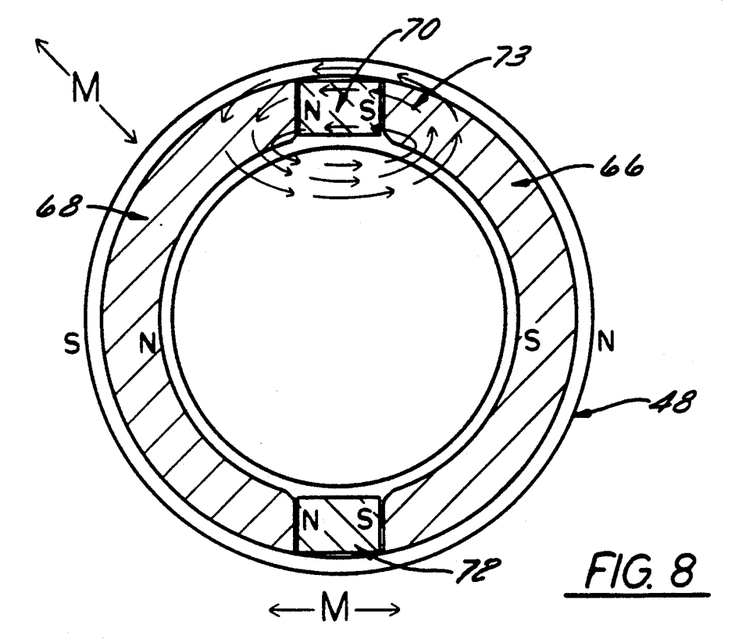
FIG. 8 is a cross-sectional view, similar to that of FIG. 6, yet illustrating an alternate two-pole construction using the interpolar diverting magnets of the present invention.

Referring now to FIG. 8, another embodiment of the present invention is shown. In this embodiment, main magnets 66 and 68 are arcuately shaped and of a subtended angle in excess of 120°. In this embodiment, interpolar diverting magnets 70 and 72 are rectangularly shaped as is illustrated.

Figure 9:
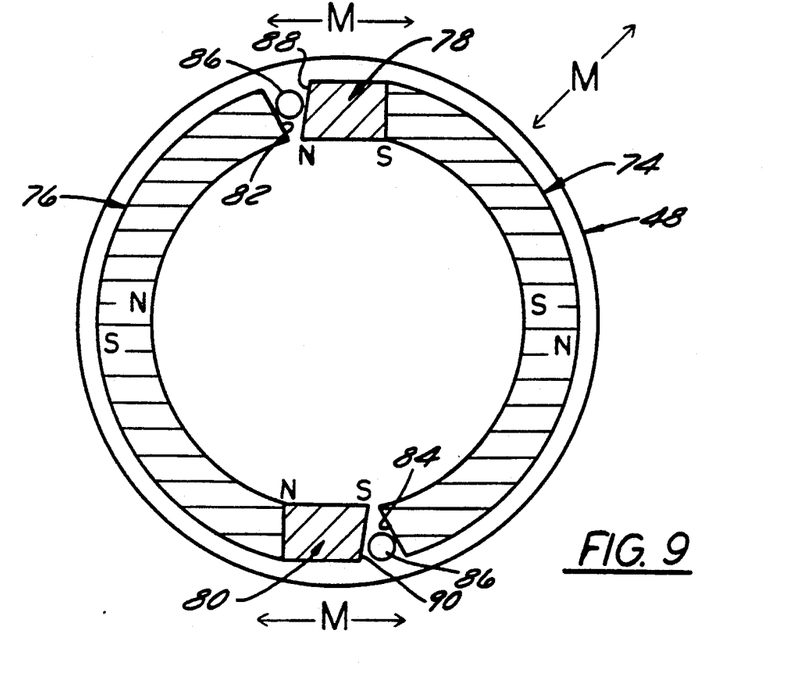
FIG. 9 is a cross-sectional view, similar to FIG. 6, but illustrating another alternate two pole construction using the interpolar diverting magnets of the present invention.
Figure 10:
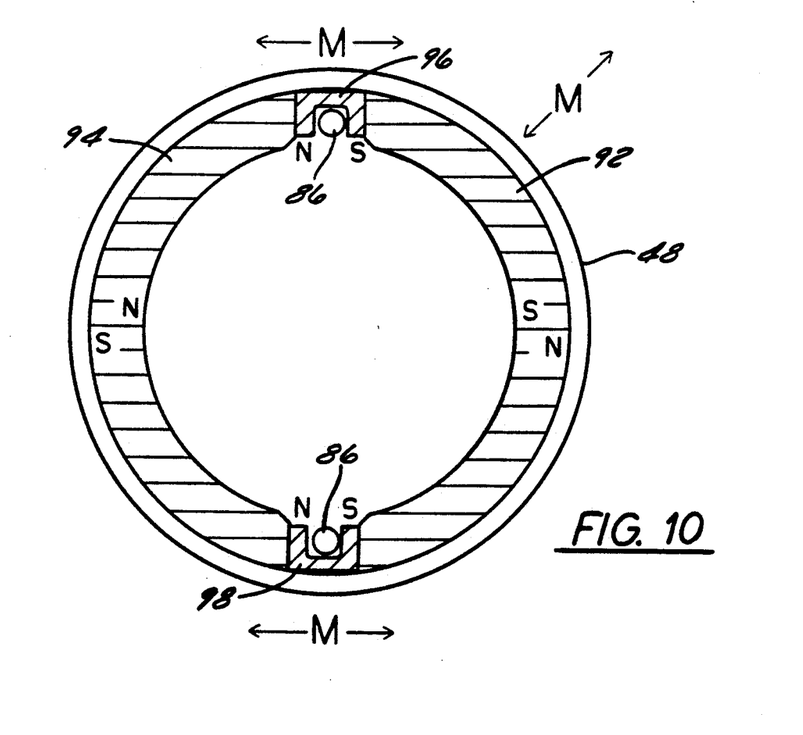
FIG. 10 is a cross-sectional view, similar to FIG. 6, but illustrating still another alternate two-pole construction using the interpolar diverting magnets of the present invention.

Referring now to FIGS. 9 and 10, two additional alternate embodiments of the present invention are shown. In each embodiment, the permanent magnet construction is suitably configured to permit the passage of through bolts 86 within the ring defined by the magnets. These through bolts are used, as is known, to hold the components of the electric motor together. With reference to FIG. 9, the permanent magnet construction includes main magnets 74 and 76 and interpolar diverting magnets 78 and 80. In this embodiment, main magnets 74 and 76 are substantially arcuately shaped but each is cut at one side thereof. Particularly, sides 82 and 84 are each squared off to permit passage of through bolts 86. Interpolar diverting magnets 78 and 80 are substantially rectangularly shaped; however, one side thereof is also cut. Particularly, each interpolar diverting magnet is also squared off at respective sides 88 and 90 to permit passage of through bolts 86.

Referring now to FIG. 10, the permanent magnet construction illustrated therein includes main magnets 92 and 94, and interpolar diverting magnets 96 and 98. In this embodiment, the main magnets 92 and 94 are arcuately shaped including a subtended angle in excess of 120° and no side of main magnet 92 nor main magnet 94 is cut or squared to facilitate through bolt passage. Rather, main magnets 92 and 94 are configured like magnets 66 and 68 of FIG. 8. Interpolar diverting magnets 96 and 98 are, however, shaped to permit passage through bolts 86 interiorly of the ring defined by the magnet construction. Particularly, interpolar diverting magnet 96 includes an inverted U shape. The notch extends the length of interpolar diverting magnet 96. Similarly, interpolar diverting magnet 98 includes a U shaped notch which also extends the entire length of interpolar diverting magnet 98. While depicted as being generally rectangularly shaped, the notches in each of interpolar diverting magnets 96 and 98 may also be arcuately shaped, provided, however, that the notch has a depth sufficient to permit passage of the through bolt 86 interiorly of the ring defined by main magnets 92 and 94 and interpolar diverting magnets 96 and 98.

It is noted that in each instance, the magnetic field of the interpolar diverting magnets is approximately perpendicular to the magnetization axis of each of the main magnets. For example, with reference to FIG. 6, it can be seen that interpolar diverting magnets 44 and 46 provide a slightly angular magnetic field, but one which is approximately perpendicular to the respective magnetization axes of the main magnets 40 and 42.

Additionally, it is noted that the orientation of the interpolar diverting magnets in each instance is such that each main magnet has homopolarity with the adjacent interpolar diverting magnet at the inner periphery of the ring defined by the magnet construction and heteropolarity at the outer periphery of the ring defined by the magnet construction. The homopolarity results in an increase in the flux density of the main magnets and an overall increase in the mmf. For example, with reference to FIGS. 8 and 9, it can be seen that the N-pole of interpolar diverting magnets 70, 72 and 78, 80 is adjacent the N-pole of main magnets 68 and 76, respectively, at the inner periphery. Additionally, the S-pole of interpolar diverting magnets 70, 72 and 78, 80 is such that it is positioned adjacent the S-pole of main magnets 66 and 74, respectively, at the inner periphery.

Furthermore, the main magnets in each construction receive heteropolarity from the interpolar diverting magnets at the outer periphery of the stator construction, thus leaving very little magnetic flux at the outer periphery of the interpolar diverting magnets due to the negative and positive divergence explained above. For example, with reference to FIGS. 8 and 9, it can be seen that the N-pole of the interpolar diverting magnets 70, 72 and 78, 80 is adjacent the S-pole of main magnets 68 and 76, respectively, at the outer periphery. Additionally, the S-pole of interpolar diverting magnets 70, 72 and 78, 80 is such that it is positioned adjacent the N-pole of main magnets 66 and 74, respectively, at the outer periphery.

With reference to FIGS. 6, 7 and 8, the magnetic path created by the interpolar diverting magnets in accordance with the invention is depicted by the flux lines 41, 51 and 73, respectively. This orientation not only provides intense magnetic flux density but also provides an excellent working gap between the two permanent magnets, namely main magnets 40 and 42 and main magnets 66 and 68 of FIGS. 6 and 8, respectively.

Referring again to FIG. 5, the permanent magnet and diverting magnet structure in accordance with the present invention may also include respective end diverting magnet assemblies 100 and 102. End diverting magnet assembly 100 includes iron ring 104 provided at one end of the stator to provide a magnetic path for the oppositely disposed end diverting magnets 106 and 108. End diverting magnets 106 and 108 are preferably attached to ring 104 by any suitable adhesive, such as epoxy.

Similarly, end diverting magnet assembly 102 includes iron ring 110 provided at the other end of the stator to provide a magnetic path for end diverting magnets 112 and 114. End diverting magnets 112 and 114 are also attached to ring 110 by any suitable adhesive, such as epoxy.

In accordance with one embodiment of the present invention, the end diverting magnets of end diverting magnet assemblies 100 and 102 are spaced apart by use of spacers. Particularly, with reference to FIG. 5, end diverting magnets 106 and 108 are spaced apart with spacers 116 and 118; likewise, end diverting magnets 112 and 114 are spaced apart with spacers 120 and 122. Spacers 116, 118, 120 and 122 preferably are formed of a plastic substance and provide a recess between the respective end diverting magnets. As best seen in FIG. 5, interpolar diverting magnets 44 and 46 in accordance with this embodiment preferably have respective extended portions 124, 126, 128 and 130. These extended portions may be received in the recess defined by spacers 116, 118, 120 and 122.

Figure 11:
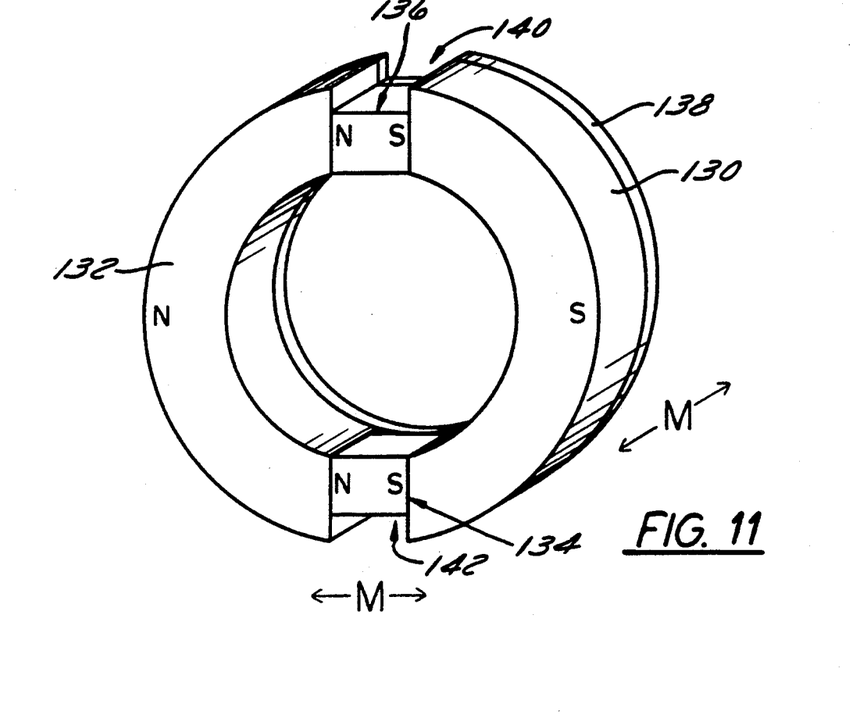
FIG. 11 is a perspective view of alternate construction of an end diverting magnet assembly in accordance with the present invention.
Figure 12:
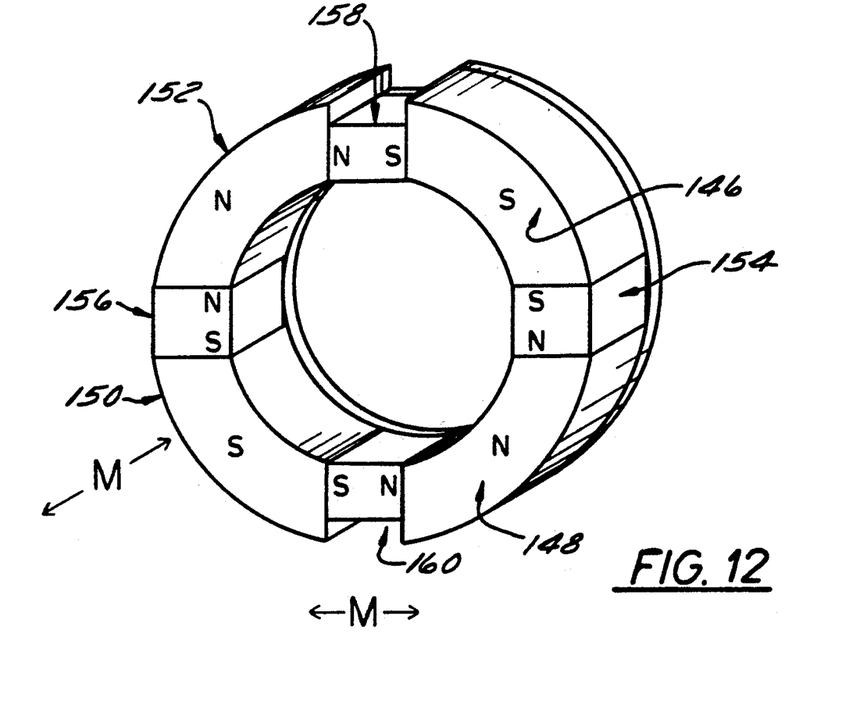
FIG. 12 is a perspective view of an end diverting magnet assembly, as in FIG. 11, yet being adapted for use with a four-pole permanent magnet construction.
Figure 13:
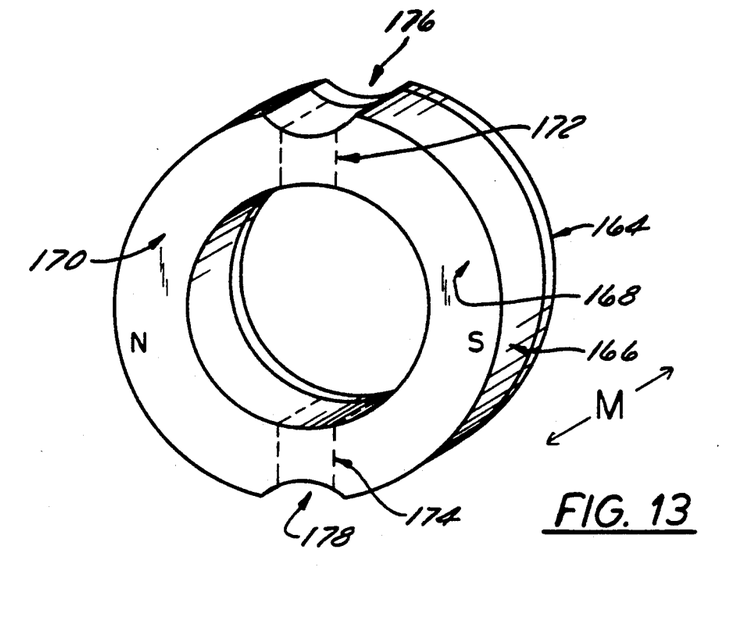
FIG. 13 is a perspective view of yet another embodiment of an end diverting magnet assembly in accordance with the present invention for use with a two-pole permanent magnet construction.

With reference to FIGS. 11, 12 and 13 alternate embodiments of the end diverting magnet assembly of the present invention are illustrated. With reference to FIG. 11, one preferred alternate embodiment of an end diverting magnet assembly for a 2-pole application includes end diverting magnets 130 and 132 and interpolar end diverting magnets 134 and 136, each of which is attached to an iron ring 138. As shown, this end diverting magnet assembly is suitably configured to permit passage of through bolts through respective notches 140 and 142 defined therein. More particularly, interpolar end diverting magnets 134 and 136 are rectangularly shaped and have a height wise dimension approximately half of the height dimension of each side of each end diverting magnet 130 and 132. Further, ring 138 includes two notches, each notch having a height substantially equal to the difference between the side height of each end diverting magnet and the height of each interpolar magnet 134 and 136.

Referring now to FIG. 12, an end diverting assembly, similar to that depicted in FIG. 11, is illustrated for use in a 4-pole application. Particularly, in this embodiment, the end diverting assembly includes end diverting magnets 146, 148, 150 and 152 and interpolar end diverting magnets 154, 156, 158 and 160. As shown, interpolar end diverting magnets 158 and 160 are dimensioned in a fashion similar to that of interpolar end diverting magnets 134 and 136 of the assembly shown in FIG. 11. Conversely, interpolar end diverting magnets 154 and 156 are rectangularly shaped having a full size. That is, interpolar end diverting magnets 154 and 156 are not reduced in size, but rather extend substantially from the inner periphery to the outer periphery of the ring defined by the magnet construction and completely fill the interpolar gap.

Referring now to FIG. 13, yet another alternate embodiment of an end diverting magnet assembly includes an iron ring 164 to which a one piece ring shaped magnet 166 is attached. Ring magnet 166 includes two poles 168 and 170 magnetized parallel to its thickness, which correspond to the end diverting magnets. Ring 166 also includes two unmagnetized zones 172 and 174 (shown in phantom) intermediate of poles 168 and 170. Two arcuate notches are formed in ring 164 which cooperate with corresponding arcuate notches in magnet 166 to form respective open spaces 176 and 178. Open spaces 176 and 178 are suitably configured to permit passage of through bolts (not shown) therethrough.

In each instance, the end diverting magnet assembly is oriented with respect to the main magnet assembly such that the end diverting magnets of the end diverting magnet assembly are adjacent the main magnets of the main magnet assembly. For example, with reference to FIG. 5, the main permanent magnets 40 and 42 are disposed in contact with the lower end diverting magnets 110 and 112 and with the upper end diverting magnets 106 and 108 by means of any suitable adhesive. That is, end diverting magnet assemblies 100 and 102 are brought into direct contact with the main magnet assembly.

Figure 14:
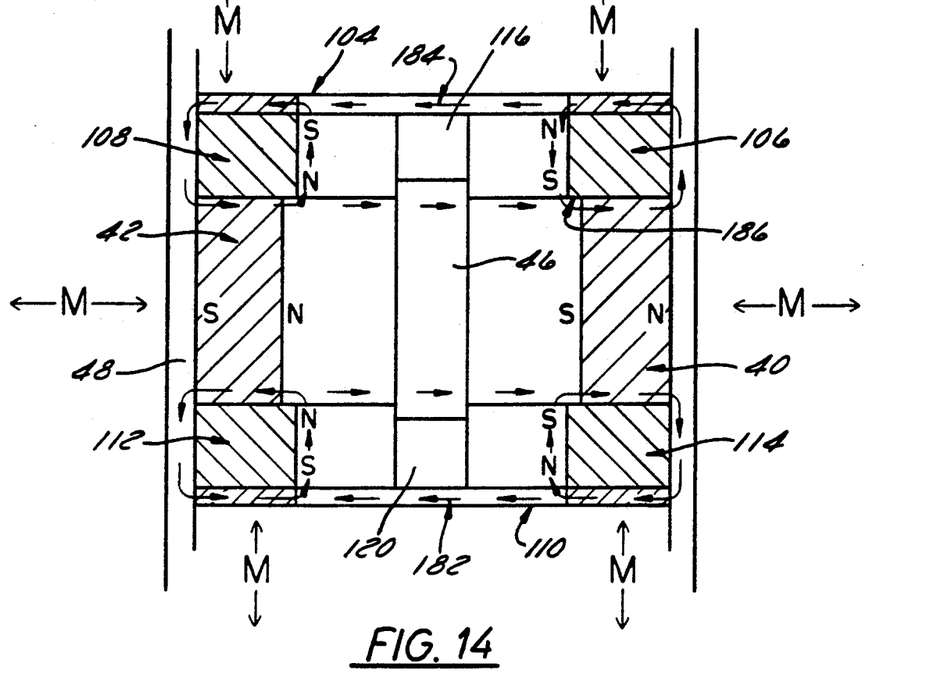
FIG. 14 is a cross-sectional view taken along the line 14—14 of FIG. 5.

Referring now to FIG. 14, it can be seen that end diverting magnets 112 and 114 provide a magnetic path 182 (indicated by the arrows) through iron ring 120 as is shown. Similarly, end diverting magnets 106 and 108 provide a magnetic path 184 (also indicated by the arrows) through iron ring 104 as is shown. Further, main permanent magnet 42 receives a homopolar magnetic field from adjacent end diverting magnets 108 and 112 at the inner periphery, and permanent magnet 40 receives a homopolar magnetic field from adjacent end diverting magnets 106 and 114 at the inner periphery. That is, the N-poles of end diverting magnets 108 and 112 are positioned adjacent the N-pole main magnet 42, and the S-poles of end diverting magnets 106 and 114 are positioned adjacent the S-pole main magnet 40. This intensifies the magnetic flux density at the inner periphery of the main stator magnets 40 and 42.

However, main magnets 40 and 42 have heteropolarity at their outer periphery with each end diverting magnet. Particularly, main magnet 40 receives a heteropolar magnetic field from adjacent end diverting magnets 106 and 114 at the outer periphery, i.e., the S-poles of end diverting magnets 106 and 114 are positioned adjacent the N-pole of main magnet 40 at the outer periphery. Further, main magnet 42 receives a heteropolar magnetic field from adjacent end diverting magnets 108 and 112 at the outer periphery, i.e., the N-poles of end diverting magnets 108 and 112 are positioned adjacent the S-pole of main magnet 42 at the outer periphery. This heteropolar magnetic field reduces the magnetic leakage due to the positive and negative divergence discussed above.

Figure 15:
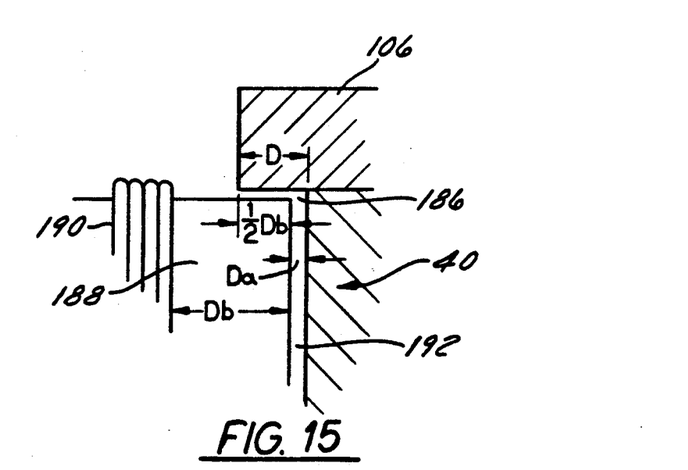
FIG. 15 is an enlarged fragmentary elevational view illustrating the relationship of the stator to a rotor in a dc electric motor of the present invention.

Preferably, the end diverting magnets, such as end diverting magnet 106, extend inwardly of the main magnets, such as main magnet 40, as is shown at extension 186 in FIG. 14. The preferred length of this inward extension is best seen in FIG. 15, which is an enlarged view of end diverting magnet 106 and main magnet 40 in conjunction with the armature 188 and respective windings 190. As shown, armature 188 is positioned adjacent end diverting magnet 106 and main magnet 40 with the air gap 192 therebetween. End diverting magnet 106 extends inwardly from main magnet 40 a distance D as noted at 186. In accordance with a preferred embodiment of the present invention the extent of the extension 186 is determined from the formula $$D = Da + \tfrac{1}{2}Db$$

where Da is the air gap distance and Db is the distance between the rotor end and the edge of the rotor coil 190. Thus, the length of the extension is preferably the sum of the air gap between the rotor and the stator plus one-half (½) the distance between the rotor periphery and the edge of the rotor coil.

Preferably, the axial length of the main stator magnets of the permanent magnet constructions of the present invention is between about 10% to about 30% longer than the axial length of the armature, and more preferably, about 15-25% longer than the axial length of the armature. This is considerably less than in a conventional dc motor in which the permanent magnet's axial length may be upwards of 50% greater than the length of the armature. When incorporated with the diverting magnets of the present invention, this feature increases the flux density and increases the mmf, thereby leading to an overall increase in the motor's efficiency.

The choice of permanent magnet material for the permanent magnets of the present invention depends in large part upon the precise application in which the permanent magnet construction is to be used. The constructions of the present invention have application in a variety of uses including, but not limited to, use in electric boat trolling motors and other marine propulsion devices, automobile motors, and subfractional motors for battery powered portable tools. Preferable materials include anisotropic, strontium ferrite, barium ferrite, neodymium-iro-boron magnet, rare earth cobalt magnet, or the like that have a high coercive force. Other magnet materials which are known to be useful or are devised by those skilled in the art are also contemplated to be within the scope of the present invention.

To assemble the stator assembly of the present invention such as shown in FIG. 5 for use in a dc motor supported by a conventional steel housing 48, end diverting magnet assembly 100 is first lowered into the housing 48. Thereafter, the main stator magnet cylinder comprising main magnets 40 and 42 and interpolar diverting magnets 44 and 46 are lowered into the housing 48, ensuring that the extended portions 128 and 130 of interpolar diverting magnets 44 and 46 fit tightly against spacers 118 and 116. Then the rotor assembly is inserted into the stator and the end diverting magnet assembly 102 placed within housing 48. The extended portions 124 and 126 of interpolar diverting magnets 44 and 46 are fit into the recesses formed by spacer 120 and 122. If one of the alternate embodiments are employed, through bolts 86 may then be passed through the assembly through the respective notches in the parts.

An experimental prototype permanent magnet dc motor built in accordance with the present invention has been found to provide 20% to 80% more mmf than a motor having conventional stator magnets and having substantially the same size. The complete improved field system disclosed herein also has been found to increase a dc motor's efficiency by about 25% to 35%, depending on the magnet material employed and the number of poles utilized. Additionally, improved mmf and efficiency have been found through use of only the interpolar diverting magnets of the present invention. In this regard, it should be appreciated that while the stator assembly has been described herein as comprising end diverting magnet assemblies 100 and 102, one or both of these assemblies may be omitted.

Use of the interpolar diverting magnets in accordance with the present invention also aids in maintaining a uniform flux density waveform over the pole arc and pole edge, and in maintaining a straight flux density in the interpolar region. In conventional slotted armature-type permanent magnet dc motors, the flux density is roughly constant and directed along the pole arc; however, the flux density is subject to an abrupt change at the edge of each pole arc (the pole edge) and the edge of the interpolar region. This flux density drop in the interpolar region generates armature pulsations which tend to make the motor noisy. The noise is due, in large part, to the slot harmonics generated in the interpolar part, which introduce fluctuations in both the torque and armature resistance.

Utilizing the interpolar diverting magnets of the present invention not only increases mmf, but also addresses this problem of motor noise. In particular, use of interpolar diverting magnets magnetized in a direction perpendicular to the axis of magnetization of the main magnets maintains substantially uniform flux density near the pole edge and substantially straight flux density in the interpole gap. As a result, slot harmonics generated in the interpolar region are reduced as is the noise of the motor. Of course, the extent to which such characteristics are engendered depends on, among other things, the type of magnet materials employed, the interpolar width, and the angular orientation of the interpolar diverting magnet with respect to the main magnets.

Figure 16:
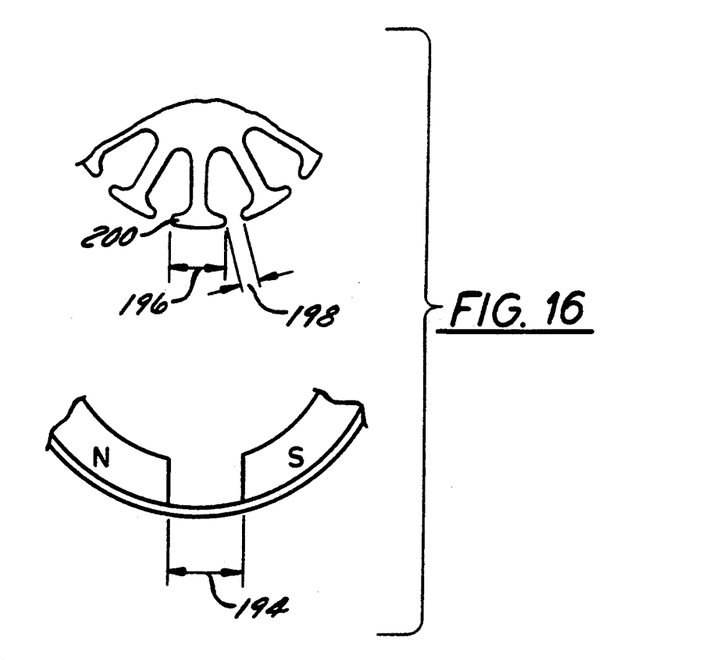
FIG. 16 is an enlarged fragmentary schematic elevational view illustrating the relationship between armature tooth width, armature slot opening and interpolar gap in accordance with a preferred embodiment of the present invention.

In accordance with a preferred embodiment of the present invention, motor noise is further lessened by reducing armature cogging. While utilizing an odd number of slots and skewed armature lamination stack to reduce armature cogging is known, this method is costly and thus useful only in rather expensive motors. In accordance with the present invention, armature cogging can be reduced by making the length of the interpolar gap substantially equal to the sum of the armature tooth width and the slot opening distance. More particularly, with reference to FIG. 16, the width 196 of the armature tooth 200 plus the armature slot opening distance 198 is equal to the interpolar gap 194. In this manner, the pole edge of the N-pole piece, designated N in FIG. 16, pulls armature tooth 200 to a clockwise position while the pole edge of the S-pole piece, designated S in FIG. 16, tends to pull armature tooth 200 to the counter-clockwise position when armature tooth 200 is in the middle of the interpole region. It has been found that this configuration tends to reduce the armature cogging by approximately 70% when incorporated with the diverting magnets of the present invention.

Therefore, in accordance with the present invention, a dc motor construction is provided that has been found to result in very high flux density and high reluctance at the inner periphery and very low magnetic leakage and low reluctance at the outer periphery due to the negative and positive divergence of the magnetic poles. Thus, it is possible to produce an inexpensive dc motor that has more power, more efficiency and is quieter than conventional dc motors of substantially the same size, without expensive electronic or other modifications.

It will be understood that the foregoing description of the invention with reference to the preferred embodiments of the invention is not intended to limit the invention to the specific form shown herein. Various modifications may be made in the design and construction of the components of the stator assembly of the present invention without departing from the scope of the invention as specified in the appended claims. For example, while the stator assembly has been described herein as comprising end diverting magnet assemblies 100 and 102, one or both of these assemblies may be omitted. In such case, the stator assembly would comprise at least a pair of oppositely disposed main magnets having interpolar diverting magnets intermediate of each main magnet.

What is claimed is:

1. A dc electric motor comprising:
   a rotor;
   a stator;
   a stator assembly including at least first and second arcuately shaped main magnets defining a ring having an inner periphery and an outer periphery, said first main magnet disposed opposite said second main magnet, said first and second main magnets being magnetized in a first direction, and at least first and second interpolar diverting magnets disposed intermediate said first and second main magnets generally within said ring, said first and second interpolar diverting magnets being magnetized in a direction perpendicular to said first direction; and
   at least one end diverting magnet assembly positioned at one end of said stator assembly, said end diverting magnet assembly including at least first and second end diverting magnets, said end diverting magnets being magnetized in a direction perpendicular to said first direction, wherein said end diverting magnet assembly is configured to permit passage of at least one through bolt interiorly of said ring.

2. An electric motor of the type having a cylindrical housing, a stator disposed within the housing and a rotor disposed within the stator, the electric trolling motor comprising:
   a stator assembly including at least first and second arcuately shaped main magnets defining a ring having an inner periphery and an outer periphery, said first main magnet disposed opposite said second main magnet, said first and second main magnets being magnetized in a first direction, and at least first and second interpolar diverting magnets disposed intermediate said first and second main magnets generally within said ring, said first and second interpolar diverting magnets being magnetized in a direction perpendicular to said first direction;
   at least one through bolt operatively associated with the components of the motor, wherein said stator assembly is configured to permit passage of said at least one through bolt within said ring; and,
   at least one end diverting magnet assembly positioned at one end of said stator assembly, said end diverting magnet assembly including at least first and second end diverting magnets being magnetized in a direction perpendicular to said first direction, wherein said end diverting magnet assembly is configured to permit passage of said at least one through bolt within said ring.

3. An electric motor of the type having a cylindrical housing, a stator disposed within the housing and a rotor disposed within the stator, the electric trolling motor comprising:
   a stator assembly including at least first and second arcuately shaped main magnets defining a ring having an inner periphery and an outer periphery, said first main magnet disposed opposite said second main magnet, said first and second main magnets being magnetized in a first direction, and at least first and second interpolar diverting magnets disposed intermediate said first and second main magnets generally within said ring, said first and second interpolar diverting magnets being magnetized in a direction perpendicular to said first direction; and
   a slotted armature having a plurality of circumferentially disposed teeth with slots therebetween, said main magnets being disposed to define interpolar gaps therebetween and said interpolar diverting magnets being positioned within said interpolar gaps, wherein said interpolar gap has a distance equal to the sum of the width of one of said armature teeth and the distance of said slot.

* * * * *